United States Patent [19]
Demers et al.

[11] Patent Number: 5,952,638
[45] Date of Patent: Sep. 14, 1999

[54] SPACE EFFICIENT METHOD OF ELECTRONIC PAYMENTS

[75] Inventors: Alan J. Demers, Boulder Creek; Daniel H. Greene, Sunnyvale, both of Calif.; Bridget A. Spitznagel, Pittsburgh, Pa.; Roy Want, Los Altos, Calif.

[73] Assignee: Xerox Corporation, Stamford, Conn.

[21] Appl. No.: 08/756,130

[22] Filed: Nov. 25, 1996

[51] Int. Cl.$^6$ .................................................. G06F 15/30
[52] U.S. Cl. .......................................... 235/379; 380/24
[58] Field of Search ................................... 235/380, 382, 235/382.5, 379; 705/21; 380/23, 24

[56] References Cited

U.S. PATENT DOCUMENTS

| | | | |
|---|---|---|---|
| 4,317,957 | 3/1982 | Sendrow | 380/24 |
| 4,321,672 | 3/1982 | Braun et al. | 705/42 |
| 4,529,870 | 7/1985 | Chaum | 235/380 |
| 4,914,698 | 4/1990 | Chaum | 380/30 |
| 4,926,480 | 5/1990 | Chaum | 380/23 |
| 5,224,162 | 6/1993 | Okamoto et al. | 380/24 |
| 5,305,383 | 4/1994 | Guillou et al. | 380/24 |
| 5,511,121 | 4/1996 | Yacobi | 380/24 |
| 5,530,235 | 6/1996 | Stefik et al. | 235/492 |

OTHER PUBLICATIONS

Chaum, D., Achieving Electronic Privacy. *Scientific American*, Aug. 1992, pp. 96–101.

Chaum, D., Achieving Electronic Privacy. *Scientific American*, Aug. 1992, pp. 96–101. Copyright (c) 1992 by Scientific American, Inc. Found on the WWW at http://ganges.cs.tcd.ie/mepeirce/Project/Chaum/sciam.html.

Chaum, D., Prepaid Smart Card Techniques: A Brief Introduction and Comparison. Copyright (c) 1994 by DigiCash bv. Found on the WWW at http://ganges.cs.tcd.ie/mepeirce/Project/Chaum/cardcom.html.

Chaum, D., Security Without Identification: Transaction Systems to Make Big Brother Obsolete. *Communications of the ACM*, vol. 28, No. 10, Oct. 1985, pp. 1030–1044.

Glassman, S. et al., The Millicent Protocol for Inexpensive Electronic Commerce. GMAGS 1995, pp. 1–19.

Hallam–Baker, P. M., Micro Payment Transfer Protocol (MPTP) Version 1.0. *Internet Draft*, Nov. 22, 1995, Expires May 27th 1996, World Wide Web Consortium, http://www.w3.org/pub/WWW/TR/WD–mptp951122.html.

Low, S. H. et al., Anonymous Credit Cards. *2nd ACM Conference on Computer and Communications Security*, IEEE, Nov. 2–4, 1994, Fairfax, Virginia, pp. 108–117.

Manasse, M. S., The Millicent Protocols for Electronic Commerce. *First USENIX Workshop on Electronic Commerce*, Jul. 11–12, 1995, pp. 117–123.

Okamoto, T. et al., Disposable Zero–Knowledge Authentications and Their Applications Ot Untraceable Electronic Cash. *CRYPTO '89*, Santa Barbara, California, Aug. 20–24, 1989, pp. 481–496.

Okamoto, T. et al., Universal Electronic Cash. *Advances in Cryptology–CRYPTO '91 Proceedings*, Berlin: Springer–Verlag, 1992, pp. 324–337.

Pedersen, T. P., Electronic Payments of Small Amounts. *Computer Science Department Aarhus University*, Aug. 1995, pp. 1–15.

Rivest, R. L. et al., Payword and Micromint: Two Simple Micropayment Schemes. May 7, 1996, pp. 1–18.

Singleton, A., Cash on the Wirehead. *BYTE*, Jun. 1995, pp. 71–78.

*Primary Examiner*—Donald Hajec
*Assistant Examiner*—Karl Frech

[57] ABSTRACT

A method of space efficient electronic payments. A customer initiates an electronic transaction by transmitting a request for payment information to a seller. In response, the customer receives from the seller the payment information needed to generate an electronic payment. The customer determines the reliability of the payment information by authenticating it. If the payment information is authenticated, then the customer generates an electronic payment using the payment information and a master key unknown to the seller. Finally, the customer transmits the electronic payment to the seller along with a request for desired goods and/or services.

22 Claims, 7 Drawing Sheets

SPACE EFFICIENT METHOD OF ELECTRONIC PAYMENTS

FIELD OF THE INVENTION

The present invention relates to a space efficient method of electronic payments. In particular, the present invention relates to a method suitable for implementation on small electronic devices.

BACKGROUND OF THE INVENTION

Several trends motivate the need for small-sized financial transactions, often called microtransactions. First, the fine granularity of information on the World Wide Web (WWW) and competition with free information on the WWW gives rise to the need to pay very small amounts for information sold on the WWW. Second, the growing number of embedded processing elements in our everyday environment motivates the need for small payments as a technique for controlling our environment.

There is no well established definition of a microtransaction. Its principal characteristic is small size and overhead. As a result, microtransactions should be off-line from a central server, and easy to compute; however, most current electronic payment protocols are computationally intensive and/or require a great deal of memory space or state.

Accordingly, a need exits for a space efficient microtransaction protocol that is suited to the limited processing and memory capabilities of small portable computation platforms, like smart cards and personal digital assistants (PDAs).

SUMMARY OF THE INVENTION

An object of the present invention is to support microtransactions.

Another object of the present invention is to allow electronic purchases to occur off-line of a financial services provider.

Yet another object of the present invention is to provide a method of electronic payment that reduces the computational cost and data requirement per microtransaction to customers.

A still further object of the present invention is to reduce the memory space requirements for sellers accepting electronic payments from their customers.

These and other objects are satisfied by the method of space efficient electronic payments of the present invention. A customer initiates an electronic transaction by requesting payment information from the seller. In response, the customer receives from the seller the payment information needed to generate an electronic payment, freeing the customer from the necessity of storing and tracking the information personally. The customer determines the reliability of the seller's payment information by authenticating it. If the payment information is authenticated, then the customer generates an electronic payment using it and the customer's master key. Finally, the customer transmits the electronic payment to the seller along with a request for desired goods and/or services. This protocol is space efficient for the customer because between session with the seller, the customer does not need to store all the information necessary to generate an electronic payment. The customer stores only the master key, relying upon the seller to provide the payment information when requested to do so.

Other objects, features, and advantages of the present invention will be apparent from the accompanying drawings and detailed description that follows.

BRIEF DESCRIPTION OF THE DRAWINGS

The present invention is illustrated by way of example and not by way of limitation in the figures of the accompanying drawings. In the accompanying drawings similar references indicate similar elements.

DETAILED DESCRIPTION OF THE PREFERRED EMBODIMENTS

Figure 1:
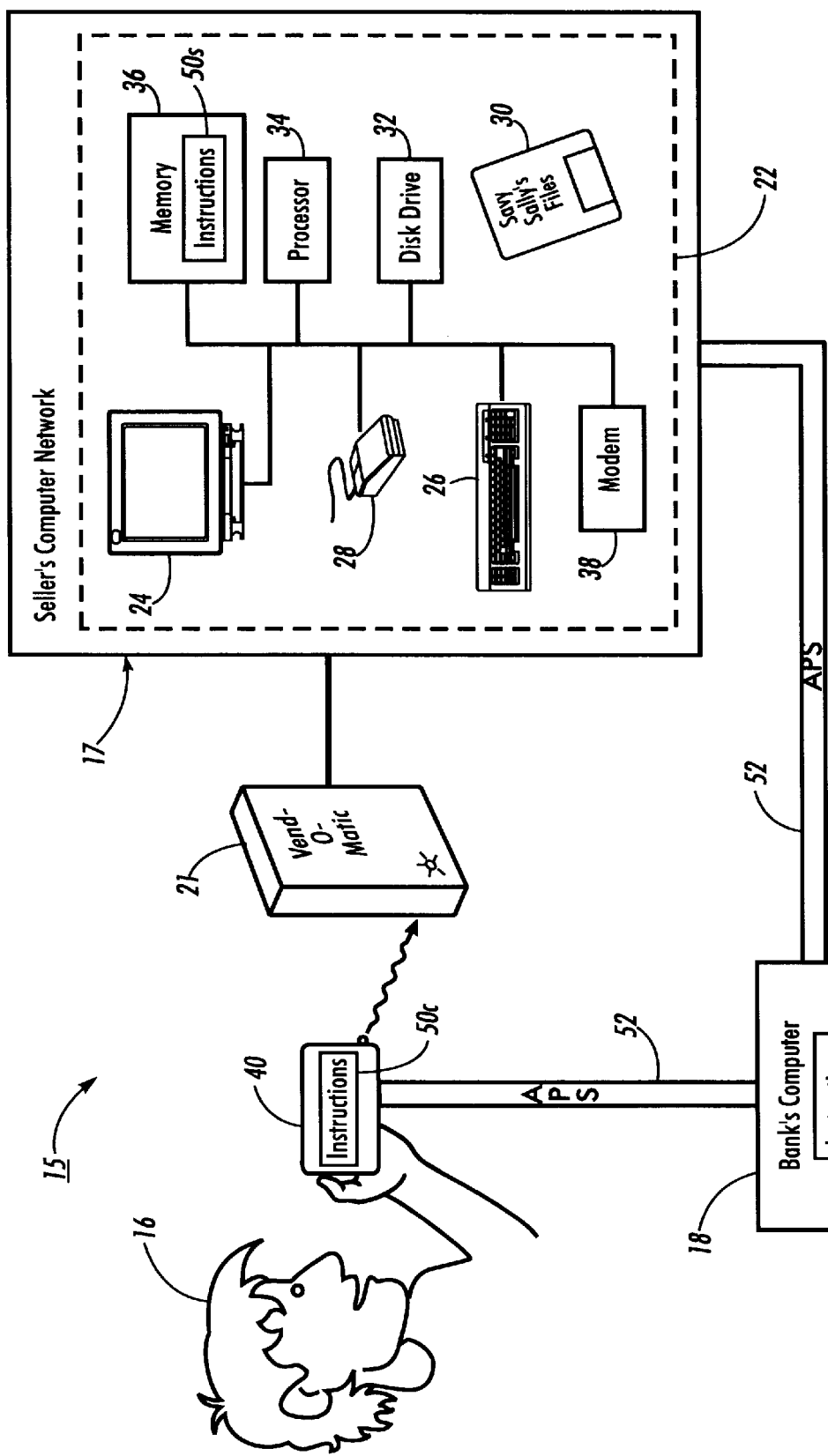
FIG. 1 illustrates a communications system in which the present invention operates.
Figure 5:
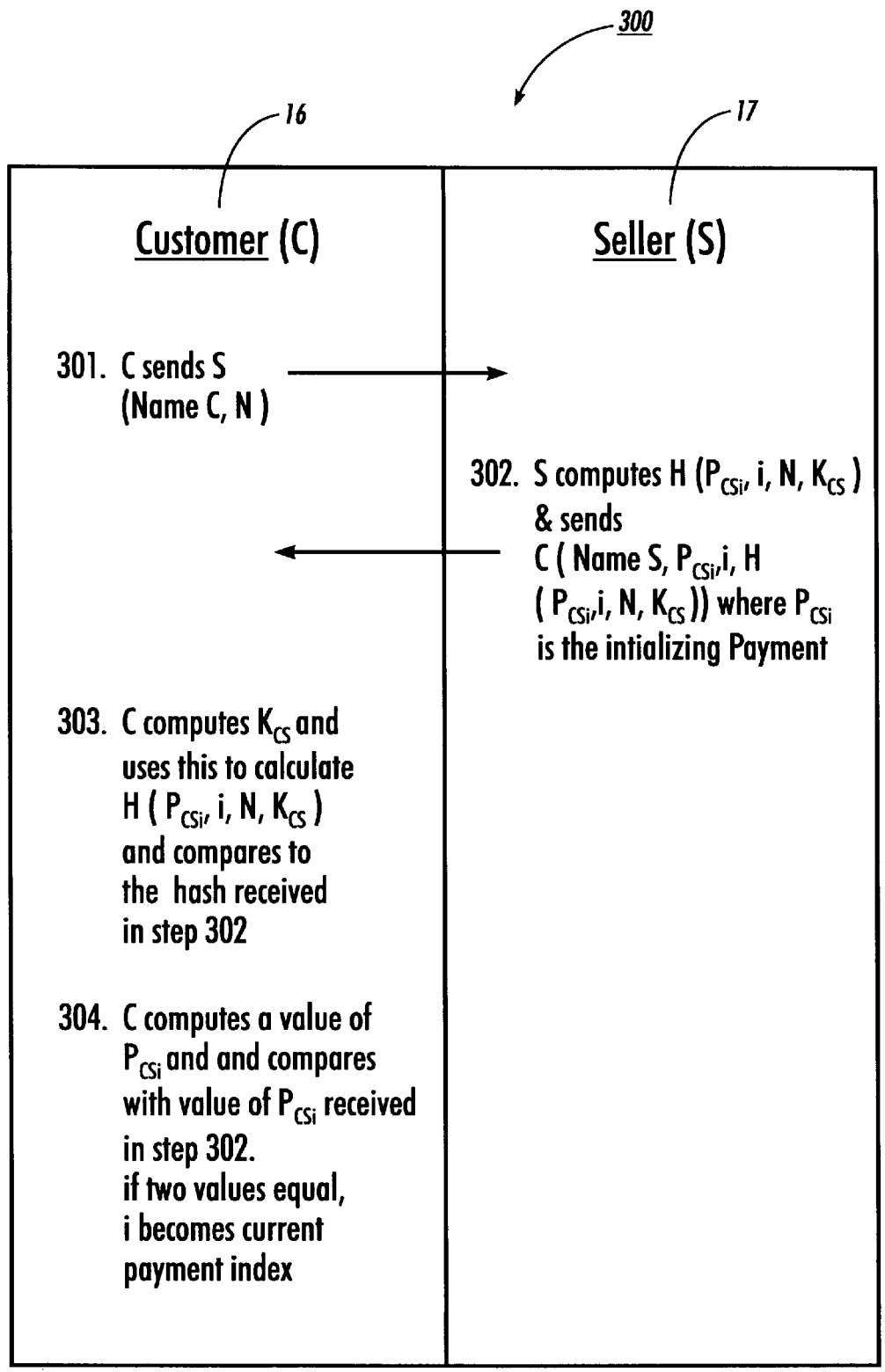
FIG. 5 illustrates a protocol for initiating a microtransaction between a customer and a seller.
Figure 6:
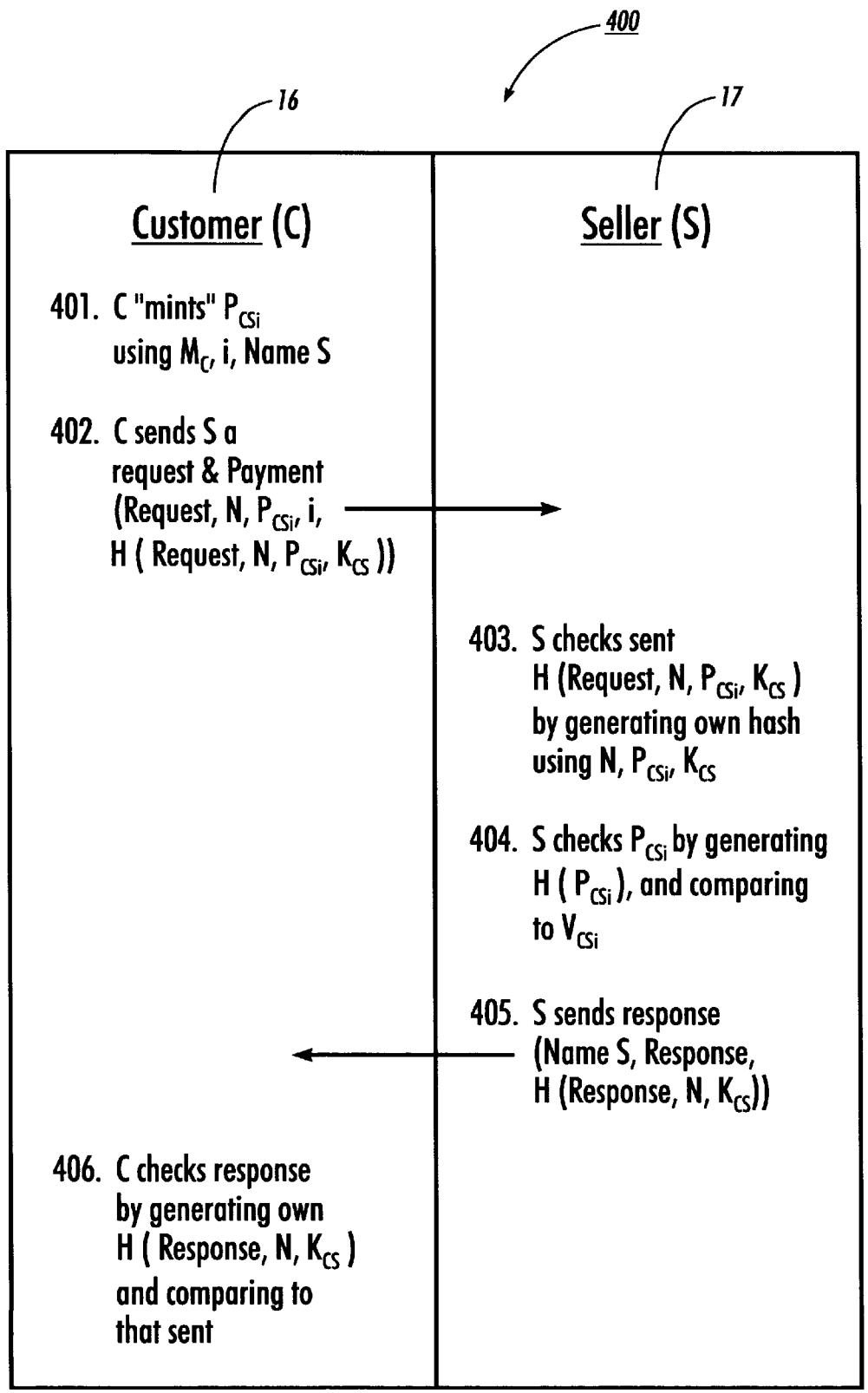
FIG. 6 illustrates a protocol for exchanging an electronic payment for goods or services.

FIG. 1 illustrates in block diagram form system 15 in which the present method is implemented by executing instructions $50c$, $50s$, and $50b$. Instructions 50 alter the operation of system 15, allowing customers 16 and sellers 17 within system 15 to engage in many electronic microtransactions off-line of bank 18. In particular, as illustrated in FIGS. 5 and 6, customer's instructions $50c$ enable customer 16 to pay for goods and services using off-line electronic payments in a way that is both spatially and computationally efficient for customer 16. Briefly described, customer 16 initiates a microtransaction by requesting payment information from seller 17. Because seller 17 provides payment information needed to generate electronic payments, customer 16 need not store such information personally. In response to the request, seller 17 sends customer 16 the payment information. After verifying the payment information, customer 16 uses it and a private master key to generate an electronic payment, which is sent to seller 17 along with a request for goods or services. The electronic payment is generated using conventional cryptography, making it computationally efficient for the customer. The present method is also spatially efficient for customer 16 because between transactions customer 16 need only store the master key, relying upon the seller to provide payment information when necessary.

A. The System

Prior to a more detailed discussion of the present invention, consider FIG. 1 and system 15, in which the present invention operates. System 15 supports commerce between customer 16 and seller 17, off-line of bank 18, using electronic payments. As used herein, an "electronic payment" is a group of electronically represented bits, on the order of 256 bits in length, which can be electronically transmitted and stored, that has some agreed upon monetary value that will be honored by financial services provider 18. Preferably, to support microtransactions, the value represented by each individual electronic payment is small, such as, for example, 0.01¢, 1¢, 25¢, $1, or $2; however, the present invention allows multiple electronic payments to be represented by a single payment so that a single electronic payment may represent a large sum. (Note that the present invention is not limited to a particular monetary unit and that several different denominations can be combined in a single system.)

Customer 16 generates the electronic payments on the fly using a private master key, which is also a group of electrically represented bits. The master key is the only state customer 16 need devote to the present system of electronic payments between purchasing sessions. All other information needed by customer 16 to generate electronic payments is provided by seller 17. The customer's master key is unknown to seller 17, but nonetheless seller 17 can verify the authenticity of the customer's electronic payments using verifiers provided by bank 18. A verifier is also a group of electrically represented bits. Clearly, bank 18 plays a vital role within system 15—accommodating the conflicting interests of customer 16 and seller 17. Bank 18 protects customer 16 from fraud by seller 17 because bank 18, not seller 17, knows the customer's master key used to generate electronic payments. Bank 18 protects seller 17 from fraud by customer 16 by providing seller 17 with verifiers that can be used to authenticate electronic payments generated by customer 16 without revealing the customer's master key.

The role of each party 16, 17, and 18 with respect to one another is defined by a series of protocols. Each of the following figures illustrates a protocol for an interaction between at least two parties and uses a portion of instructions 50c, 50s, and/or 50c. Because of this instructions 50c, 50s, and 50b are not illustrated separately.

1. The Customer's Hardware

Any person or entity purchasing goods or service via system 15 using electronic payments is a customer 16. Customer 16 preferably communicates with seller 17 using a hand-held portable computing device 40. Because of its portability hand-held computing device 40 is ideal for purchasing goods and services from vending machines 21, parking meters, or copy machines (not shown), for example.

Figure 2:
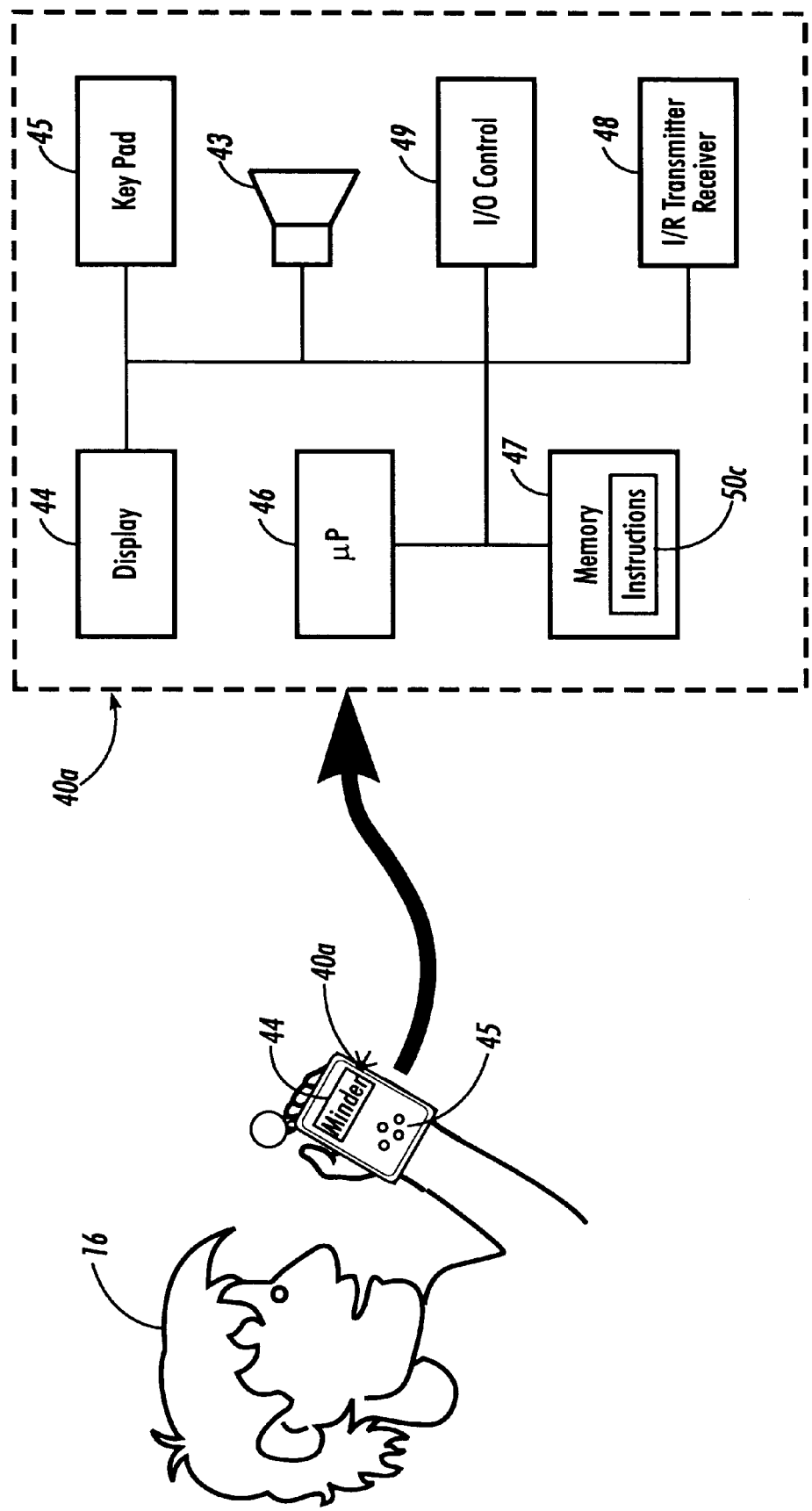
FIG. 2 illustrates a minder.

Hand-held computing device 40 is preferably realized as a minder 40a, shown in FIG. 2. Minder 40a is small and portable, small enough that it can be attached to a key-ring and carried comfortably in a purse or pocket. Minder 40a includes a liquid crystal display (LCD) 44 for displaying information to customer 16. Customer 16 may communicate with minder 40a using primitive input controls 45, such a few buttons. LCD 44 and input controls 44 help protect customer 16 from fraud. For example, minder 40a could interrogate an automatic teller machine to authenticate identity and inform customer 16 via LCD 44 if the automatic teller machine were not authentic. As shown in block diagram form, minder 40a also includes processor 46, a small amount of solid state memory 47, preferably on the order of 64 KB to 128 KB, and a wireless infra-red (IR) transmitter/receiver 48, a speaker 43 for phone communications, and input/output control 49. (The types of devices that may be used to realize memory 47 will be described below with respect to computer 22 and its memory.) Memory 47 stores the customer's master key and compiled instructions 50c. (Instructions 50c may be written in any computer language, including, but not limited to, C++, Java, or Lisp, for example.) The method of the present invention accommodates limited memory storage because between off-line electronic transactions minder 40a need only store instructions 50c and the customer's master key. Additionally, the present invention accommodates limited processing capabilities for processor 46 because instructions 50c use conventional cryptography. A number of means can be used to communicate with seller devices like vending machine 21; e.g. transmitter/receiver 48, a telephone, or a docking station coupled to the Internet Input/Out control 49 permits processor 46 to control and communicate with LCD 44 and input controls 45.

Hand-held computing device 40 can also be realized using devices other than minder 40a. Hand-held computing device 40 can be realized using any device that is small and portable, includes a processor, a limited amount of memory, and a transmitter/receiver, which may be either wireless or wired. In other words, a liquid crystal display (LCD) and input/output controls are not necessary to the present invention. For example, a smart card could be used to realize hand-held computing device 40a, like the iPower PCMCIA (1) card produced by National Semiconductor Corporation of Santa Clara, Calif.

Alternately, customer 16 may communicate with seller 17 and bank 18 using other types of computing devices. For example, customer 16 may use a computer 22, a set top box, a personal digital assistant (PDA), a network computer, or an Internet appliance.

Communications via hand-held computing device 40 with seller 17 are not particularly secure, nor private, but they need not be according to the present invention. In contrast, communications between customer 16 and bank 18, do need to be secure. For this reason, while customer 16 communicates with bank 18 via the telephone network or the Internet, customer 16 uses an Authentication and Privacy Service (APS) 52 to provide the necessary authentication and privacy services. APS 52 will not be described in detail, although those messages protected by APS 52 will be indicated. Depending upon how APS 52 is implemented, steps may have to be added to those described with respect to protocols of FIGS. 3–7 to integrate with system 15. Kerberos is an example of a well-known software package that can be used to realize APS 52.

In the following discussion of FIG. 3–7, in the interest of brevity actions may be described as being executed by customer 16; however, it will be understood that these actions are actually executed by the customer's hardware.

2. The Seller's Hardware

Any person or entity within system 15 accepting electronic payments for the sale of goods and/or services is a seller 17. Seller 17 may peddle wares over a variety of networks, such as the Internet, and/or via automatic vending machines 21, which are tightly integrated with the seller's computer device or network.

Typically, computing device 22 includes monitor 24 for visually displaying information to users. Computing device 22 also provides users multiple avenues to input data including keyboard 26 and mouse 28. Alternately, users may input data stored on a magnetic medium, such as a floppy disk 30, by inserting the disk into floppy disk drive 32. Processor 34 controls and coordinates the operations of computing device 22 by executing instructions 50s stored electronically in memory, either memory 36 or on a floppy disk 30 within disk drive 32. Typically, operating instructions for processor 34 are stored in solid state memory, allowing frequent and rapid access to the instructions. Instructions 50s, like instructions 50c, may be written in any computer language, including, but not limited to, C++, Java, or Lisp. Seller 17 will also store verifiers and other customer related information within memory 34. Semiconductor logic devices that can be used to realize memory 36 include read only memories (ROM), random access memories (RAM), dynamic random access memories (DRAM), programmable read only memories (PROM), erasable programmable read only memories (EPROM), and electrically erasable programmable read only memories (EEPROM), such as flash memories.

Large sellers may use a computer network—multiple computing devices coupled together, and capable of communicating with one another, via a server running network software, such as, for example, TCP/IP.

Seller 17 may communicate with customer 16 and bank 18 in a variety of ways. If security is not a concern, as is generally the case during transactions with customer 16, seller 17 may use either the transmitter/receivers associated with its vending machines 21 or modulator/demodulator (modem) 38 coupled to the telephone network or Internet. In those situations in which information security and privacy is required, as is generally the case during communication with bank 18, seller 17 may use an Authentication and Privacy Service (APS) 52 to communicate over the Internet of the telephone network.

In the following discussion of FIG. 3–7, in the interest of brevity actions may be described as being executed by seller 17; however, it will be understood that these actions are actually executed by the seller's hardware.

3. The Bank and Its Hardware

Within system 15 bank 18 may be any individual or institution with whom seller 17 and customer 16 have an agreement and who is capable of aggregating electronic payments and submitting them to a larger electronic payment system. Pursuant to their agreement, bank 18 may charge the customer's redeemed electronic payments against the customer's checking account, savings account, credit card, or debit card. Similarly, bank 18 may credit the seller's checking account, savings account or credit account for redeemed electronic payments. Bank 18 may also be an internal corporate organization responsible for accounting for units that may be without monetary value. For example, within an organization members may be entitled to a number of free sodas a month, in which case bank 18 would keep track of the number of sodas consumed each month by all members of the organization.

Like sellers 17, each bank 18 uses at least one computing device, like computing device 22 or a computer network to couple to the Internet of the telephone network to use an APS 52. Instructions 50b for generating verifiers and redeeming electronic payments are stored within the memory of the bank's computing device or computer network. Instructions 50b may be written in any computer language, including, but not limited to, C++, Java, or Lisp, for example. Bank 18 will also store within its memory information relevant to the relationship between customer 16 and seller 17, such as each one's personal identifier, the customer's master key and the pair's sessions key.

In the following discussion of FIG. 3–7, in the interest of brevity actions may be described as being executed by bank 18; however, it will be understood that these actions are actually executed by the bank's hardware.

B. The Basic Microtransaction Protocol

1. Enabling Off-line Electronic Payments

Figure 3:
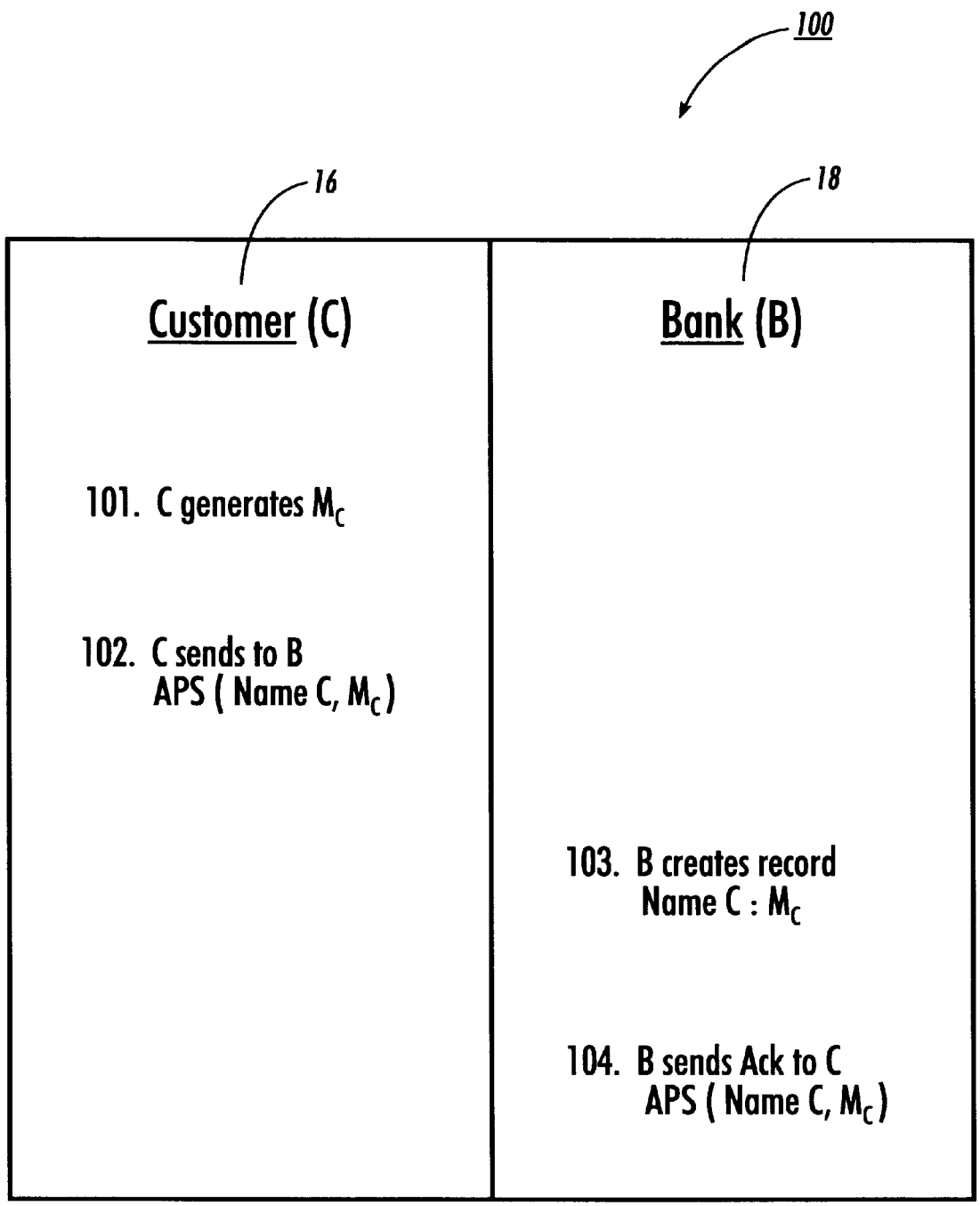
FIG. 3 illustrates a protocol for establishing a customer account with a bank.
Figure 4:
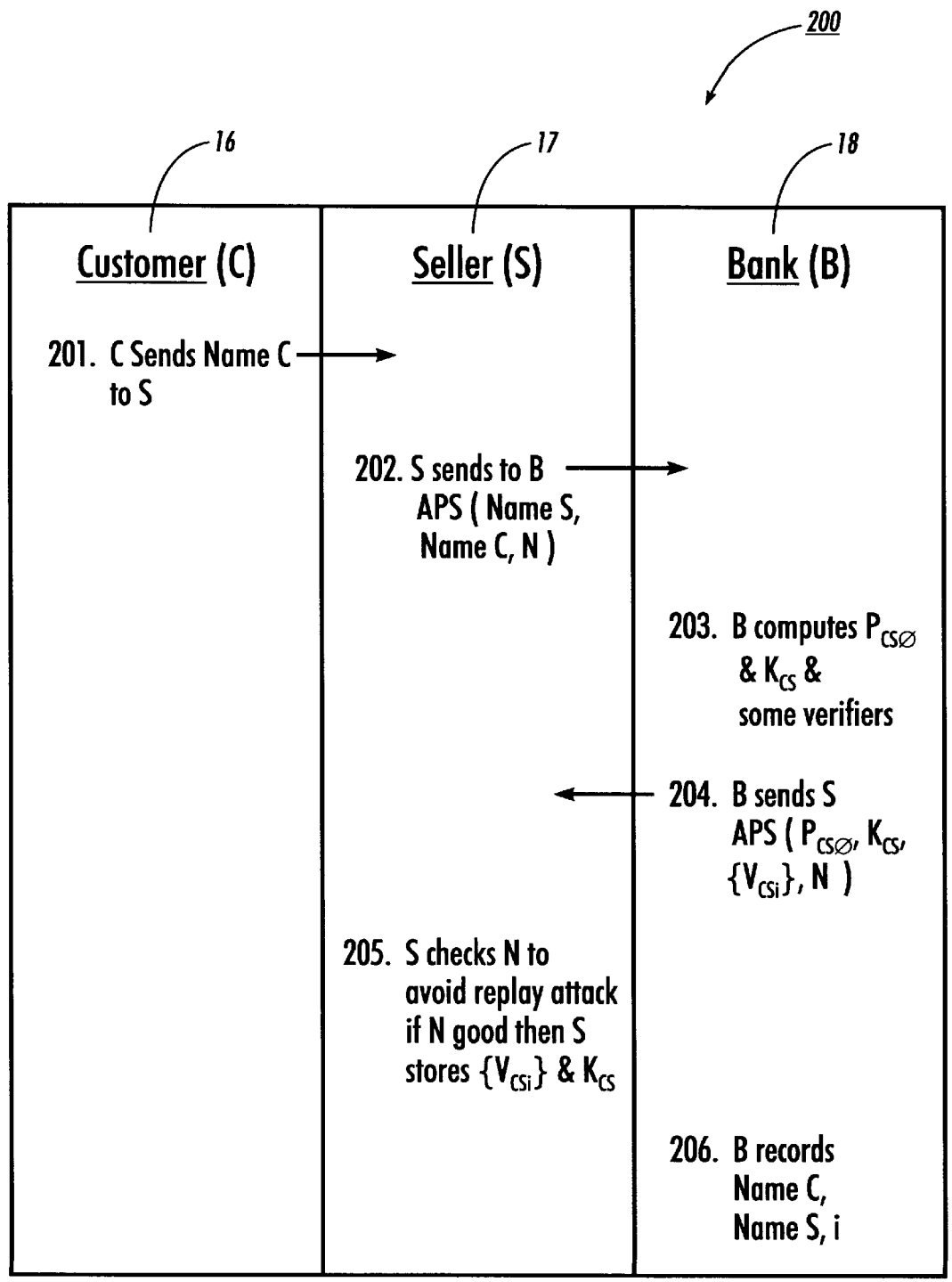
FIG. 4 illustrates a protocol for initiating a relationship between a customer and a seller.

Enabling off-line electronic payments between customer 16 and seller 17 requires some preparation ahead of time. First, as shown by FIG. 3, customer 16 must establish an account with bank 18. Next, as shown by FIG. 4, customer 16 approaches seller 17 to inform the seller of the buyer's wish to do business using electronic payments so seller 17 can obtain verifiers from bank 18. Once these things are done, customer 16 and seller 17 may go off-line of bank 18.

FIG. 3 illustrates protocol 100 by which customer 16 establishes an account with bank 18. Steps 101 and 102 of the protocol form part of the customer's instructions 50c, while steps 103 and 104 form part of the bank's instructions 50b.

Protocol 100 begins in step 101 with customer 16 generating a master key, Mc. As stated previously, the master key is a set of electronically represented bits that customer 16 uses to generate electronic payments. Subsequently, during step 102 customer 16 transmits a personal identifier, designated NameC, and the master key to bank 18 via APS 52. Using APS 52 provides customer 16 security and privacy while transmitting such sensitive information. Bank 18 responds to receipt of the customer's personal identifier and master key by storing them as a record in a master key database within its computer memory, as shown in step 103. That done, during step 104 bank 18 acknowledges receipt of the customer's information by resending that information via APS 52.

Steps 101 and 102 may be realized in an alternative manner. Bank 18 may generate the master key during step 101 and transmit it to buyer 16 during step 102.

FIG. 4 illustrates protocol 200 for establishing initial contact between customer 16 and seller 17. Step 201 forms part of the customer's instructions 50c, steps 202 and 205 form part of the seller's instructions 50s, while steps 203, 204, and 206 form part of the bank's instructions 50b Customer 16 contacts seller 17 during step 201 by sending the customer's personal identifier, NameC, via an unsecured channel using minder 40a. Receipt of this identifier informs seller 17 that customer 16 wants to do business electronically and that seller 17 should obtain verifiers for future electronic payments from customer 16. Consequently, during step 202 seller 17 forwards to bank 18 the customer's personal identifier along with the seller's personal identifier. The seller's personal identifier is designated NameS in FIG. 4. The seller's message also includes a nonce, N, to protect seller 17 from a replay attack. (Within the cryptographic arts a nonce is a large, random, number, say 64 bits, used in only one cycle of a protocol.) These three pieces of information are transmitted to bank 18 via APS 52.

Bank 18 treats the information received from seller 17 during step 202 as a request for verifiers to authenticate electronic payments from the identified customer. Bank 18 responds to this request during step 203 by generating a number of pieces of information. First, bank 18 generates a conversation key, Kcs, to be used by seller 17 and customer 16 to authenticate one another. Kcs is a hash of the concatenation of the seller's identifier, NameS, and the customer's master key, Mc. Second, bank 18 calculates an initializing payment to be exchanged between customer 16 and seller 17. Each initializing payment has no monetary value and is used to establish the current value of the payment index. Typically, the initializing payment will be the last previously spent electronic payment; however, when there are no previously spent electronic payments, then the initializing payment will be associated with a value of zero for the payment index. Bank 18 calculates the initializing payment by taking the hash of a string generated by concatenating Mc, NameS, and a payment index, i; i.e.; $P_i$=H(Mc, NameS, i). (Other quantities may be included in the string hashed to generate the payment, if desired.) Bank 18 determines the appropriate value of the payment index to use during step 203 by consulting a database for a record belonging to the same customer-seller pair. If such a record exists, bank 18 uses the value of the payment index found in the record when generating the payment. If no such record is found, bank 18 creates a record and sets to zero the value of the payment index.

During step 203 bank 18 generates a number of verifiers for seller 17 to use in verifying future electronic payments to be received from customer 16. The number of verifiers generated at any one time is a design choice dependent upon the traffic and bandwidth of the communication network used and the amount of memory seller 17 is willing to devote to storing verifiers. Bank 18 generates the verifier, Vj, for each electronic payment, Pj, where j=i+1, i+2, i+3, etc., by taking the hash of a string including Pj. In other words, Vj=H(H(Mc, NameS, j)), which can be expressed as $H^2$(Mc, NameS, j). The hash function used to generate Vj need not be the same as the hash function used to generate Pj, in which case Vj=G(H(Mc, NameS, j)) All that is necessary is that bank 18 and customer 16 agree upon the hash function used to generated electronic payments and that bank 18 and seller 17 agree upon the hash function used to generate verifiers from electronic payments. Verifiers protect seller 17 from fraud by customer 16 because seller can take the hash of a string including a payment and compare it to the corresponding verifier. Seller 17 is assured Pj is valid if H(Pj)=Vj. These verifiers also protect customer 16 from fraud by seller 17 because given $H^2$(Mc, NameS, j) seller 17 cannot determine Mc.

Next, during step 204, bank 18 transmits to seller 17 using APS 52 the initializing payment, the conversation key, Kcs, the set of verifiers {Vi}, and nonce, N. Protocol 200 can be made more secure by modifying steps 203 and 204. During step 203 additional security can be obtained by including the payment index in the string hashed to generate a verifier; e.g. $V_i=H(P_i, i)$. During step 204 limiting the number of verifiers sent to seller 17 also provides additional security.

Upon receipt of the bank's message during step 205, seller 17 checks the nonce received to the one transmitted during step 202. If the two nonces are the same, then seller 17 regards as reliable the verifiers and conversation key accompanying the nonce and stores the information for future use. Seller 17 is now prepared to accept electronic payments from customer 16 off-line of bank 18.

2. Completing the Buyer's Preparations for Off-line Microtransactions

Upon completion of protocol 200, seller 17 is prepared to accept electronic payments, however, customer 16 is not prepared to generate electronic payments. This is because to generate electronic payments in addition to the master key customer 16 needs payment information, such as the value of payment index i, the seller's personal identifier, and the master key, but customer 16 does not typically store information other than the master key. FIG. 5 illustrates protocol 300, by which customer 16 obtains from seller 17 the payment information necessary to generate the next electronic payment. Customer 16 not only uses protocol 300 for the initial contact with seller 17, but also whenever customer needs the payment information, such as after a hiatus in spending.

Steps 301 and 303 form part of the customer's instructions 50c, while step 302 is part of the seller's instructions 50s.

Using minder 40 during step 301 customer 16 transmits to seller 17 a request for payment information from the seller. Payment information includes an initializing payment and the last value of the payment index, i. The request for payment information is represented by the customer's personal identifier, NameC, and a nonce, N. As before, the nonce is used to protect customer 16 from a replay attack.

Seller 17 recognizes the customer's personal identifier as a request for the payment information necessary to generate the next electronic payment. Seller 17 responds in step 302 by retrieving the conversation key it shares with the customer, Kcs, the initializing payment, $P_{csi}$, which is typically the last payment received from customer 16, and the last value of the payment index, i. Seller 17 sends this information to customer 16 along with an assurance that the payment information indeed comes from seller 17. That assurance takes the form of a hash of a concatenated string including the nonce, N, Pcsi, i, and Kcs. Seller 17 then transmits to customer 16 via an unsecured channel NameS, Pcsi, i, and H(Pcsi, i, N, Kcs).

Seller 17 could attempt to cheat during step 302 by sending customer 16 as the initializing payment a payment spent prior to the last payment, say Pi-n; however, in doing so seller 17 cheats himself, not customer 16, because this allows customer 16 to double-spend an electronic payment. Seller 17 cannot cheat by sending a payment in advance of that last spent because seller 17 cannot generate Pi+n given Pi or Vi+n.

Customer 16 responds to receipt of the payment information from seller 17 during step 303 by determining whether the message just received really originates from seller 17. Customer 16 does so by taking the received values of the initializing payment, Pcsi and i and concatenates them with its own calculated value of Kcs and its stored value of N to generate a string. This string may include other quantities if desired. Customer 16 then takes the hash of the concatenated string, and compares its hash to that received from seller 17. If the two hashes are equal, customer 16 treats the message as originating from seller 17.

Having decided that the payment information originates with seller 17, customer 16 determines during step 304 whether the payment information is reliable. Customer 16 does this by calculating his own value of the initializing payment and comparing his value to that received from seller 17. Customer 16 determines a value of the initializing payment by taking the hash of a string including the value of the payment index just received from seller 17 and the master key. If the value calculated for the initializing payment matches that received from seller 17, then buyer 16 considers the value of the payment index to be reliable and will use it in generating electronic payments.

3. An Off-line Transaction Using Electronic Payments

FIG. 6 illustrates protocol 400 for a single off-line microtransaction; however, customer 16 and seller 17 are free to engage in as many microtransactions per session as they please until the seller's supply of verifiers has been exhausted. This amortizes over many microtransactions the computational cost of on-line connections with bank 18 during protocols 200 and 500. Steps 401, 402 and 406 form part of the customer's instructions 50c, and steps 403, 404 and 405 are part of the seller's instructions 50s.

Protocol 400 begins with step 401, after customer 16 has decided upon the desired goods and/or services and has determined their cost by some means that are not part of the present protocol, such as advertisements, negotiations or information exchanged between the buyer and seller. Customer 16 uses this information to mint an electronic payment adequate to pay for the desired purchase. Customer 16 can generate a single electronic payment to pay for the entire purchase, rather than several, even though each electronic payment has a unit value. This is because of the assumption that electronic payments will be spent in index order. Thus, if payment Pi has not yet been received from customer 16 then receipt of payment Pi+n leads to the assumption that it includes payments Pi+n through Pi. This reduces the computational cost to customer 16 of generating electronic payments and reduces the amount of information per purchase that customer 16 must send to seller 17. Customer 16 mints the electronic payment by choosing a value of the payment index i sufficient for the purchase, concatenating that value with the master key and the seller's personal identifier, and then determining the hash of the concatenated string. Before transmitting the electronic payment to seller 17, customer 16 generates a hash that will reassure seller 17 that the payment comes from customer 16. This is a hash of a concatenation of a string including the request, the electronic payment, the payment's index value, the conversation key, and a nonce. Afterward, during step 402 customer 16 transmits to seller 17 via minder 40 the request, the electronic payment, the index value associated with the payment, the nonce, and the hash H(Request, Pi, i, Kcs, N). Alternately, if customer 16 wants to transmit this information securely the conversation key Kcs can be used to encrypt the information transmitted during step 402.

Seller 17 responds to receipt of the customer's request and payment during step 403 by determining whether the message came from customer 16. Seller 17 does so by taking the values received for the request, the nonce, the index, and Pi and concatenating these with the seller's own value for their shared conversation key, along with any other desired quantities. Seller 17 then takes the hash of this string and compares it to that received from customer 16. If the two hashes are equal, then seller 17 assumes that customer 16 is who he says he is. Having authenticated the customer's identity, seller 17 turns attention to authenticating the customer's payment during step 404. Seller 17 does this by taking the hash of a string including Pi and comparing it to Vi. Seller 17 considers payment Pi valid if H(Pi)=Vi. Seller 17 responds to a valid electronic payment by sending customer 16 an indication of the intended response—this may be the goods or service, or an indication of when customer 16 can expect the goods and/or services he requested. This response is accompanied by the seller's personal identifier and an assurance that the transmission comes from seller 17. The assurance takes the form of a hash of a concatenated string including the response, the nonce received during step 402, and the conversation key.

Customer 16 determines the reliability of seller's 17 response during step 406.

4. Redeeming Electronic Payments

Figure 7:
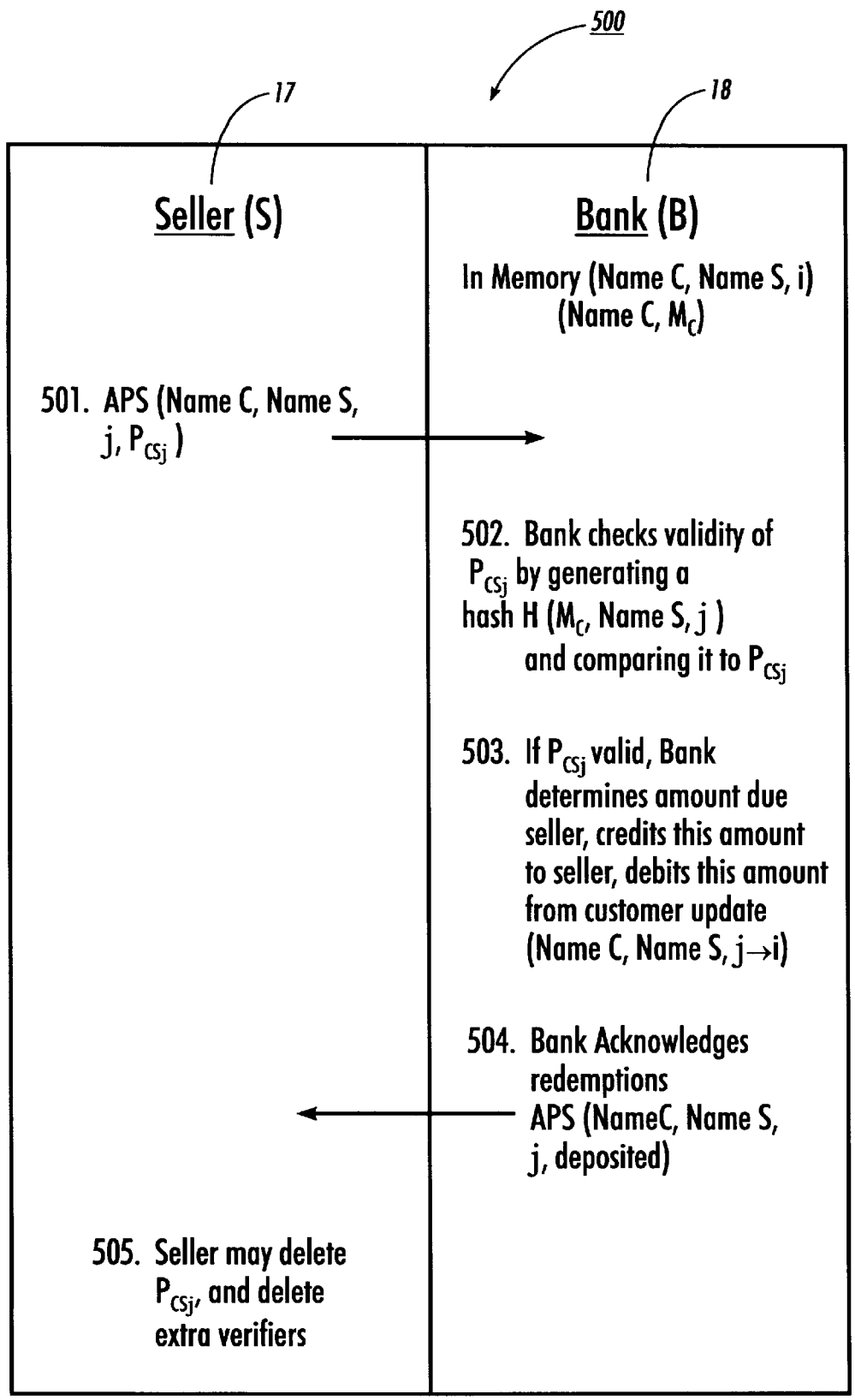
FIG. 7 illustrates a protocol for a seller to redeem electronic payments with a bank.

After a number of off-line microtransactions, seller 17 may wish to redeem electronic payments with bank 18. FIG. 7 illustrates protocol 500 used by seller 17 to achieve that goal. Steps 501 and 505 of protocol 500 from part of the seller's instructions 50s, while steps 502–504 are part of the bank's instructions 50b.

Redemption of electronic payments begins in step 501 with the transmission of a redemption request from seller 17 to bank 18 via APS 52. The request takes the form of a transmission including the customer's personal identifier, the seller's personal identifier, the index for the last electronic payment received from the customer, j, and the last electronic payment, Pj. Just as customer 16 can represent several electronic payments using a single electronic payment by increasing the payment index value, so seller 17 can represent every electronic payment between the last redeemed electronic payment, Pi, and the last electronic payment received, Pj, using a single electronic payment, Pj. This reduces the amount of information seller 17 must send to bank 18. This advantage arises from the assumption that electronic payments are spent and redeemed in index order.

Bank 18 responds to the seller's redemption request during step 502 by determining whether Pj is authentic. Bank 18 does so by generating Pj itself using payment index value j provided by seller 17 and retrieving the customer's master key. Bank 18 then concatenates Mc, NameS, and j and takes the hash of this string. The string calculated by bank 18 must match Pj received from seller 17 or Pj will not be redeemed. If Pj is valid, then during step 503 bank 18 does two things. First, bank 18 stores the value j of the payment index received from seller 17 in memory for use the next time customer 16 invokes protocol 200. Second, bank 18 determines the amount by which seller's account is to be credited and the customer's account is to be debited. Bank 18 does this by retrieving from memory the payment index value i for the last electronic payment redeemed by seller 17 using the seller's and the customer's personal identifiers. Bank 18 then calculates the amount represented by Pj by multiplying by the unit electronic payment value the difference between i and j. Bank 18 may now credit the seller's account and debit the customer's account by the appropriate amount. Finally, during step 504, bank 18 acknowledges the redemption by sending to seller 17 via APS 52 the customer's personal identifier, the seller's personal identifier, j, and the amount deposited to the seller's account.

Upon receipt of the redemption notice from bank 18, during step 505, seller 17 may delete from its computer memory the last payment, Pj, it received from customer 16 if seller 17 does not expect to do business with customer 16 again in the near future. At this point, based upon the same consideration, seller 17 may also delete from its computer memory any other verifiers it is storing for electronic payments from customer 16

5. Privacy for Payments, Requests and Redemptions

The basic protocol described above with respect to FIGS. 3–7 can be modified slightly to provide privacy and authentication for communications between customer 16 and seller 17 without using APS 52. During steps 302 and 402, for example, the customer may desire privacy. Seller 17 can easily provide it by encrypting the information to be transmitted using the conversation key, Kcs, shared with customer 16. Note that when seller 17 does encrypt information transmitted to buyer 16 using the conversation key, that the encryption also serves to authenticate the information as originating from seller 17. As a consequence, when encrypting information seller 17 need not include a hash of the information being sent to customer 16.

C. Balancing the Customer's Account

As with any checking account or credit card account, customer 16 will be interested in reconciling the balance of an electronic payment account with the bank's records. The basic protocol discussed above in Section B can be modified to allow customer 16 to reconcile the electronic payment account while remaining a space efficient protocol for customer 16. The most important modification to permit account balancing is the use of an epoch index, e, in conjunction with electronic payment. An epoch is a short period of time, say on the order of a week, during which an electronic payment submitted for redemption will be honored by bank 18. A new epoch begins often enough so that adjacent epochs overlap each other. Thus, for epochs of about a week's duration a new epoch would begin every two or three days. Additionally, every customer 16 and seller 17 doing business with bank 18 would use the same epoch index. Another modification to support account balancing is that customer 16 must devote state to an absolute balance, and to balances for amounts spent during each epoch since the epoch of the absolute balance. Using these balances customer 16 can compute a running balance. The state devoted by customer 16 to reconcile the electronic payment account is independent of the number of sellers 17 paid or the number of electronic payments made.

Given that summary of the modifications necessary to support account balancing, consider now in detail the changes to protocols 200, 300, 400 and 500. The first modification occurs in protocol 200. The first time during an epoch seller 17 requests verifiers bank 18 informs seller 17 of the new epoch index and the date on which electronic payments generated during that period will no longer be honored. Bank 18 may not need to transmit the epoch expiration data if there is a convention followed, such as each epoch ends on a Saturday, for example. As a result of using epoch indexes, bank 18 must change the quantities it uses to generate verifiers to mirror the quantities customer 16 will use to generate an electronic payments. That is to say, determining step 203 bank 18 will concatenate the epoch index with Mc, NameS, and i to generate Vi, where Vi=H$^2$ (Mc, NameS, i, e). Seller 17 stores the verifiers and the epoch index in memory during step 205.

Informed of the new epoch index, it is now the task of seller 17 to inform customer 16 of that index value. Seller 17 does so the first time during an epoch that customer 16 requests the payment index. In response, during step 302 the information sent to customer 16 also includes the epoch index. There is no advantage to seller 17 in attempting to mislead customer 16 about the epoch index. If seller 17 gives customer 16 an epoch index that is not current, seller 17 runs the risk that the electronic payments she receives from customer 16 will not be redeemed by bank 18.

Customer 16 stores the new epoch index within the memory of minder 40. The first time this information becomes relevant to customer 16 is the next transmission of an electronic payment. During step 401 he modifies the value he hashes to generate an electronic payment by including the epoch index. In other words, Pi=H(Mc, NameS, i, e). Customer 16 should reset payment index to 0 each time he begins spending electronic payments in a new epoch. Additionally, during step 401 customer 16 increases by Pi the balance in memory for this epoch and decreases by the same amount the running balance. Finally, during step 402, the information transmitted to seller 17 includes the epoch index associated with Pi.

Redemption protocol 500 is also affected by the use of epoch indexes. During step 501 the redemption request submitted by seller 17 to bank 18 includes the epoch index for the payments being redeemed. When seller 17 wishes to redeem payments from multiple epochs, for each epoch seller 17 must transmit to bank 18 the last payment received in the epoch and that epoch index. Subsequently, during step 502 while checking the validity of a payment bank 18 must use the epoch index, in much the same way it was used to generate the verifiers during modified step 203.

Some time after a set of epochs has expired and when bank 18 will no longer honor redemption requests for electronic payments for the set of epochs, bank 18 sends all customers 16 bank statements informing them of the amounts debited from their account during each epoch since the last statement and the customer's final balance, Bal$_{ce}$, as of epoch e. Using this information, customer 16 may reconcile the balances stored within the memory of minder 40. When sellers 17 fail to redeem the customer's electronic payments within the appropriate epoch, then the bank's statement will reflect less spending than customer 16 has recorded. In this case, customer 16 is able to replace his expired epoch balances with the absolute balance provided by bank 18.

D. Decreasing the Seller's State

The basic protocol discussed above in Section B is space efficient for customer 16 but requires that bank 18 generate, and seller 17 store, many verifiers. A number of modifications, used alone or in combination, can decrease the computational load for bank 18 and the memory space used by seller 17 to support the electronic payment protocol.

1. Hash Chains as Verifiers

Using hash chains as verifiers allows seller 17 to store a single verifier for each group of α electronic payments. This is because each payment received from customer 16 acts as the verifier for the next payment received from customer 16. Each payment index, i, derives α electronic payments and verifiers by iterating the hash function α+1 times. According to this approach:

$P_1 = H^1(Mc, NameS, i)$ $P_2 = H^2(Mc, NameS, i) = H(P_1) = V_1$ $P_3 = H^3(Mc, NameS, i) = H(P_2) = V_2$ $P_{\alpha-1} = H^{\alpha-1}(Mc, NameS, i) = H(P_{\alpha-2}) = V_{\alpha-2}$ $P_\alpha = H^\alpha(Mc, NameS, i) = H(P_{\alpha-1}) = V_{\alpha-1}$ $H(P_\alpha) = V_\alpha$ For each payment to serve as the verifier for the next payment, customer 16 must spend payments in reverse order of α. In other words, customer 16 spends payment $P_\alpha$ first, and before $P_{\alpha-1}$, and spends payment $P_1$ last, and after payment $P_2$.

Given that brief description of using hash chains as verifiers to save seller state, now consider in detail modifications to protocols 200, 400, and 500. The first change to the basic protocol occurs during step 203, illustrated in FIG. 4. Bank 18 computes the verifiers for a group of α electronic payments by iterating a hash function α+1 times on the concatenated string of Mc, NameS, i. Bank 18 has calculated every verifier for the chain of payments, but during step 204 transmits only the first verifier needed by seller 17, the verifier for the first electronic payment to be spent by customer 16, $V_\alpha$. If the number of electronic payments in a hash chain are agreed upon, then bank 18 need not transmit α to seller 17, nor customer 16. Thus, during step 205 seller 17 stores only a single verifier for electronic payments from customer 16.

The next change to the basic protocol occurs during step 401, illustrated in FIG. 6. The first time customer 16 intends to transmit an electronic payment to seller 17, customer 16 must compute the remaining electronic payments in the hash chain for the current index number. Customer 16 thereafter stores the remaining electronic payments in volatile memory. After computing the entire first hash chain, customer 16 need not compute an entire hash chain all at once. Thereafter, each time customer 16 spends one electronic payment, customer 16 also computes another electronic payment in the next hash chain. The seller's response to an electronic payment is substantially what it was, except after checking the validity of the payment during step 404 seller 17 stores the payment to use as the verifier for the next electronic payment received from customer 16.

The last changes to the basic protocol occurs during step 502, illustrated in FIG. 7. Bank 18 determines the validity of the electronic payment submitted for redemption during step 502. To do so, bank 18 must iterate the hash of Mc, NameS, i until a string is generated that is equal to the electronic payment received. If no hash within the chain is equal to the electronic payment, then bank 18 concludes the electronic payment is invalid and will not redeem it.

2. Summary Verifiers

The verifier scheme used in the basic protocol can be modified in another fashion that also permits seller 17 to accept lots of electronic payments without having to store lots of verifiers. Here bank 18 provides seller 17 with each verifier for a first group of k electronic payments, and thereafter with just a summary for each subsequent group of k verifiers. The summary verifier, $S_i$, is a hash of all k verifiers of a group of k electronic payments; i.e., $$S_i = H(V(P_{ik+1}), V(P_{ik+2}), \ldots V(P_{(i+1)k}));$$

where:

V(Pi) is the verifier for the ith electronic payment; and $S_i$ is the summary verifier for the (ik+1)th electronic payment through the ((i+1)k)th electronic payment.

Each time customer 16 sends seller 17 a payment Pi customer 16 also sends a verifier Vi+k for payment Pi+k. Thus, before customer 16 is ready to begin spending the next group of k electronic payments, seller 17 has received all k verifiers for the group and has checked their validity against the summary verifier provided by bank 18. An advantage of this modification is that it places no extra state burden upon customer 16 and adds only one extra computation to those required to generate an electronic payment acceptable to seller 17. Additionally, this modification reduces the amount of state seller 17 must devote to storing verifiers.

The value of k should be chosen to balance the memory space needed to store the first k verifiers against the memory space needed to store summary verifiers. That is to say, n total verifiers can be stored in space $2k$, where $k=\sqrt{n}$.

Further reductions in the state devoted by seller 17 to verifiers is possible by recursively applying summary verification. For example, a single summary verifier could be used to represent a group of k summary verifiers.

Given this brief description, now consider in detail the changes to protocols 200 and 400. The first change in the basic protocol occurs during step 203, illustrated in FIG. 4. During step 203 bank 18 responds to the seller's request for verifiers. The first time it receives such a request bank 18 generates k verifiers in the same fashion discussed previously. Thus, for example, if the current value of i is 1 and k is 50, then bank 18 generates verifiers for electronic payment $P_1$ through $P_{50}$ by taking the hash of the concatenated string of verifiers for those payments. Additionally, during step 203 bank 18 generates a summary verifier for the next group of k electronic payments. To continue the example, bank 18 would generate a summary verifier for electronic payments $P_{51}$ through $P_{100}$. This would continue for subsequent blocks of 50 verifiers, so that verifiers beyond $V_{50}$ would be transmitted to seller 17 in summary form.

The next change in the basic protocol occurs during payment protocol 400, illustrated in FIG. 6. During step 401, in addition to generating an electronic payment $P_i$, customer 16 generates a verifier for payment $P_{i+k}$, $V_{i+k}$. $V_{i+k} = H(P_{i+k}) = H^2(Mc, NameS, i+k)$. Customer 16 transmits the verifier to seller 17 during step 402. How seller 17 verifies the authenticity of electronic payment Pi depends whether the electronic payment is among the first group of k electronic payments for which bank 18 sent individual verifiers. If so, seller 17 verifies the authenticity of the electronic payment in the same manner discussed previously. On the other hand, if the electronic payment is not one for which bank 18 sent an individual verifier, then seller 17 has already received a verifier for the payment from customer 16 and has made a decision about the dependability of the verifier. Seller 17 regards the verifier, and the group to which it belongs, as dependable if a hash of the group of k verifiers is equal to the summary verifier sent by bank 18. Seller 17 will have made this decision before receipt of the electronic payment. If the verifier is dependable, seller 17 checks the authenticity of the electronic payment by comparing a hash of it to the appropriate verifier.

3. Probabilistic Verification

The basic protocol can be modified in yet a third way to reduce the memory space seller 17 must devote to storing verifiers. Rather than verifying each electronic payment, seller 17 verifies only some electronic payments and stores only verifiers for those electronic payments. The reduction in required memory space is purchased by increased risk to seller 17, rather than increased costs to customer 16. The risk to seller 17 can be minimized by verifying electronic payments in a random fashion and by setting a maximum gap, d, between verifiers. In other words, the size of the gap between verifiers is randomly determined, with a maximum gap of no more than d. Because the size of the gap between verifiers is random, but no more than d, the seller's exposure to fraud by customer 16 is limited to a small amount of money. In return for this limited risk, seller 17 realizes a savings in memory space of c, where $c=(d-1)/2$.

This probabilistic scheme can be implemented in a number of ways. One simple approach is to use a pseudo-random number generator to generate gaps between verifiers uniformly in the range $[0 \ldots d]$. This verification scheme can be incorporated into the basic protocol at a number of points. In one embodiment, bank 18 and seller 17 agree upon a random number generator via APS 52. Thereafter, during step 203 using the random number generator, bank 18 generates a subset of verifiers and transmits them to seller 17. Alternatively, bank 18 generates the entire set of verifiers during step 203 and later during step 406 seller 17 uses a random number generator to winnow the group of verifiers down to a smaller number.

Using probabilistic verification also reduces the computational burden to seller 17 of accepting electronic payments according to protocol 400, illustrated in FIG. 6. During step 404, seller 17 determines the validity of only those electronic payments for which seller 17 has verifiers. Additionally, whenever seller 17 does verify an electronic payment, seller 17 notes that fact for later use during redemption.

Redemption protocol 500 should be altered when seller 17 does not verify every electronic payment received from customer 16. During step 501 seller 17 transmits the last verified electronic payment and its payment index, in addition to the last payment received and its payment index. In response, during step 502 bank 18 checks the validity of the last payment received. If bank 18 determines that the last payment received is invalid, then bank 18 checks the validity of the last payment that seller 17 verified. If this payment is valid, bank 18 assumes the validity of every payment between that last redeemed and the last verified electronic payment. Bank 18 also assumes the invalidity of every electronic payment between the last verified and the last received from customer 16. Bank 18 informs seller 17 during step 405 whenever the last payment received from customer 16 is invalid.

E. Conclusion

In the foregoing specification, the invention has been described with reference to specific exemplary embodiments thereof. It will, however, be evident that various modifications and changes may be made thereto without departing from the broader spirit and scope of the invention as set forth in the appended claims. Accordingly, the specification and drawings are to be regarded in an illustrative rather than a restrictive sense.

What is claimed is:

1. A space efficient method of electronic payments using a machine having a memory, the memory storing a master key, the master key being unknown to a seller, the method comprising:

a) transmitting a request for payment information to the seller;

b) receiving from the seller the payment information; the payment information including a value of a payment index and an initializing payment;

c) authenticating the payment information received from the seller;

d) if the payment information is authenticated, generating an electronic payment using the master key and the payment information; and e) transmitting to the seller a request and the electronic payment.

2. The method of claim 1 wherein the payment information received from the seller further comprises a first hash of a first string including a first value of a conversation key and the value of the payment index.

3. The method claim 2 wherein authenticating the payment information received from the seller comprises:

determining a second value for the conversation key using the master key;

generating a second hash of a second string including the value of the payment index and the second value of the conversation key; and comparing the second hash to the first hash.

4. The method of claim 3 wherein generating the electronic payment further comprises iteratively hashing a third string including the value of the payment index and the master key to generate a chain of k electronic payments.

5. The method of claim 2 wherein the first string includes the initializing payment.

6. The method of claim 1 wherein the payment information further comprises an epoch index.

7. The method of claim 1 wherein generating the electronic payment further includes generating a verifier for a second electronic payment.

8. The method of claim 1 wherein the payment information includes a first value of a conversation key, wherein the payment information is encrypted, and wherein authenticating the payment information received from the seller comprises:

determining a second value for the conversation key using the master key;

decrypting the payment information using the second value of the conversation key; and comparing the second value of the conversation key to the first value of the conversation key.

9. An article of manufacture for use in a machine comprising:

a) a memory;

b) instructions stored in the memory for a space efficient method of electronic payments for use in conjunction with a master key, the master key being unknown to a seller, the instructions being machine readable, the method comprising:

1) transmitting a request for payment information to the seller;

2) receiving from the seller the payment information; the payment information including an initializing payment and a value of a payment index;

3) authenticating the payment information;

4) if the payment information is authenticated, generating an electronic payment using the master key and the payment information; and 5) transmitting to the seller a request and the electronic payment.

10. The article of manufacture of claim 9 wherein the payment information further comprises a first hash of a first string including the value of the payment index and a first value of a conversation key.

11. The article of manufacture of claim 10 wherein the instruction of authenticating the payment information comprises:

determining a second value for the conversation key using the master key;

generating a second hash of a second string including the value of the payment index and the second value of the conversation key; and comparing the second hash to the first hash.

12. The article of manufacture of claim 11 wherein the instruction of generating an electronic payment further comprises iteratively hashing a third string including the value of the payment index and the master key to generate a chain of k electronic payments.

13. The article of manufacture of claim 10 wherein the instruction of generating an electronic payment further includes generating a verifier for a second electronic payment.

14. The article of manufacture of claim 10 wherein the first string includes the initializing payment.

15. The article of manufacture of claim 10 wherein the payment information further comprises a first value of a conversation key, wherein the payment information is encrypted and wherein the instruction of authenticating the payment information comprises:

determining a second value for the conversation key using the master key;

decrypting the payment information using the second value of the conversation key; and comparing the second value of the conversation key to the first value of the conversation key.

16. The article of manufacture of claim 9 wherein the instruction of receiving payment information further comprises receiving an epoch index.

17. An apparatus for space efficient electronic payments comprising:

a) a transmitter/receiver for communicating with other machines;

b) a processor coupled to the transmitter/receiver; and c) a memory coupled to the processor storing instructions executable by the processor, the instructions implementing a space efficient method of electronic payments for use in conjunction with a master key, the master key being private to the customer, the instructions comprising:

1) transmitting a request for payment information to a seller;

2) receiving from the seller the payment information; the payment information including an initializing payment and a payment index:

3) authenticating the payment information;

4) if the payment information received from the seller is authenticated, generating an electronic payment using the master key and the payment information; and 5) transmitting to the seller a request and the electronic payment.

18. The apparatus of claim 17 wherein the payment information received from the seller further comprises a first hash of a first string that includes the value of the payment index and a first value of a conversation key.

19. The apparatus of claim 18 wherein the instruction of authenticating the payment information received from the seller comprises:

determining a second value for the conversation key using the master key;

generating a second hash using a second string including the value of the payment index and the second value of the conversation key; and comparing the second hash to the first hash.

20. The apparatus of claim 19 wherein the instruction of generating an electronic payment further comprises iteratively hashing a third string including the value of the payment index and the master key to generate a chain of k electronic payments.

21. The apparatus of claim 17 wherein the instruction of receiving the payment information further comprises receiving an epoch index.

22. The apparatus of claim 17 wherein the instruction of generating an electronic payment further includes generating a verifier for a second electronic payment.

* * * * *